(12) United States Patent
Gordon

(10) Patent No.: US 9,273,368 B2
(45) Date of Patent: Mar. 1, 2016

(54) PROCESS FOR DIRECT REDUCTION OF IRON OXIDE

(75) Inventor: Iakov M. Gordon, Toronto (CA)

(73) Assignee: Hatch Ltd., Mississauga, Ontario (CA)

( * ) Notice: Subject to any disclaimer, the term of this patent is extended or adjusted under 35 U.S.C. 154(b) by 173 days.

(21) Appl. No.: 14/235,277

(22) PCT Filed: Jul. 16, 2012

(86) PCT No.: PCT/CA2012/000678
§ 371 (c)(1),
(2), (4) Date: Jan. 27, 2014

(87) PCT Pub. No.: WO2013/013295
PCT Pub. Date: Jan. 31, 2013

(65) Prior Publication Data
US 2014/0150607 A1    Jun. 5, 2014

Related U.S. Application Data

(60) Provisional application No. 61/511,668, filed on Jul. 26, 2011.

(51) Int. Cl.
*C21B 11/02* (2006.01)
*C21B 13/02* (2006.01)
*C21B 13/00* (2006.01)

(52) U.S. Cl.
CPC ............... *C21B 13/02* (2013.01); *C21B 11/02* (2013.01); *C21B 13/004* (2013.01); *C21B 13/0073* (2013.01); *C21B 2100/02* (2013.01); *C21B 2100/04* (2013.01); *Y02P 10/122* (2015.11); *Y02P 10/128* (2015.11); *Y02P 10/136* (2015.11)

(58) Field of Classification Search
CPC .................................. C21B 11/02; C21B 13/02
See application file for complete search history.

(56) References Cited

U.S. PATENT DOCUMENTS

| 5,064,467 | A | 11/1991 | Dam et al. |
| 5,833,734 | A * | 11/1998 | Cip ..................... C21B 13/0033 266/142 |
| 5,840,097 | A | 11/1998 | Dam |
| 6,270,550 | B1 | 8/2001 | Gordon et al. |
| 6,551,549 | B2 | 4/2003 | Bueno et al. |
| 2011/0247457 | A1 | 10/2011 | Knop et al. |

* cited by examiner

*Primary Examiner* — George Wyszomierski
*Assistant Examiner* — Tima M McGuthry Banks
(74) *Attorney, Agent, or Firm* — Bereskin & Parr LLP

(57) ABSTRACT

A process for direct reduction of iron oxide in a shaft furnace. The process includes feeding iron oxide to the furnace, passing the iron oxide successively downwardly through a pre-reduction zone, a transition zone, a metallization zone, and a cooling zone while passing rich fuel gas produced by external partial combustion with a sub-stoichiometric volume of air upwardly through the pre-reduction zone in counter-current flow so as to partially reduce the iron oxide, and passing reducing gas downwardly through the metallization zone in co-current flow so as to substantially complete the reduction of the iron oxide to metallic iron. The reducing gas is first pre-heated in a gas heater and then subjected to partial combustion with oxygen to further increase its temperature. The process includes removing a metallized iron product from the cooling zone.

23 Claims, 3 Drawing Sheets

PROCESS FOR DIRECT REDUCTION OF IRON OXIDE

FIELD

Figure 1:
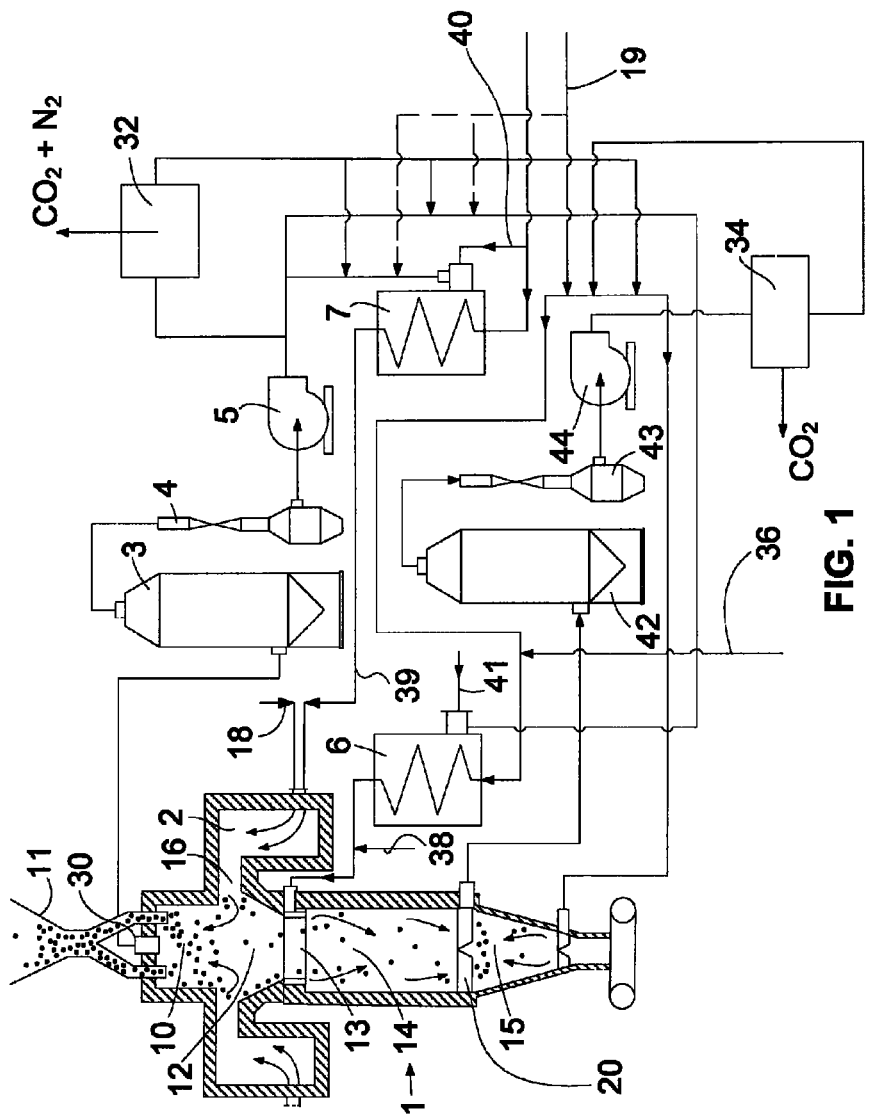

The present subject matter relates to a process for the direct reduction of iron oxide charge material in a shaft furnace using a reducing gas. The reducing gas could be, for example, the product of natural gas reforming and methane decomposition, or synthetic gas produced in a coal gasifier. The process is particularly effective for direct reduction of iron concentrate pellets or lump ore coated with a mineral solution to inhibit agglomeration.

INTRODUCTION

Conventional technologies for direct reduction of iron oxide charge material utilize counter-current flow of charge materials and reducing gas, and utilize external reformers or gasifiers and sulfur cleaning equipment to produce the reducing gas. This equipment is expensive and requires special catalysts, typically nickel based, for its operation, and thus has significant impact on the economics of the operation. Attempts have accordingly been made to eliminate such external reforming equipment from the direct reduction process by effecting reforming within the furnace, with fresh metallized iron from the charge itself acting as a catalyst.

A process for direct reduction of iron ore pellets or lump ore that utilizes natural gas self-reforming in the metallization zone in a co-current flow of reducing gas containing a significant fraction of methane and partially pre-reduced and pre-heated iron bearing material which enter the metallization zone near its top and exit near its bottom is described in U.S. Pat. No. 6,270,550, the disclosure of which is incorporated herein by reference.

The furnace is characterized by a pre-reduction zone in its uppermost portion, transitioning to an intermediate zone, which separates the pre-reduction zone from a final metallization zone. The metallization zone transitions to a cooling zone at the lowest portion of the shaft furnace. Direct reduced iron (DRI) is recovered from a cooling zone that is situated below the metallization zone.

Up to 45-55% reduction is carried out in the pre-reduction zone in a counter-current flow of rich fuel gas produced in external burners with a sub-stoichiometric air to gas ratio. The charge material is also heated in the pre-reduction zone reaching a temperature at the bottom of pre-reduction zone of about 900-1000° C. Final metallization occurs in a metallization zone which is substantially independent from the pre-reduction zone.

At the boundary between the metallization zone and the intermediate zone, the metallization zone receives a co-current gas flow containing a mixture of natural gas and recycled gas evacuated from the shaft furnace. The recycled gas is heated in a heater up to 700-950° C. (but not subjected to external combustion). As the charge material descends through the metallization zone, its temperature drops from 900-1000° C. to 600-700° C.

The intermediate zone includes a narrowed throat between the pre-reduction zone and the metallization zone in which 5-10% of reducing gas from the metallization zone passes upwardly to the pre-reduction zone preventing products of incomplete combustion from the pre-reduction zone from penetrating into the metallization zone.

Disadvantages of this process include:
a) The low material temperature in the pre-reduction zone requires that the reducing gas temperature from the pre-heater be in the range of about 700-950° C., and introducing the reducing gas at such temperatures can cause metal dusting in the pre-heater.
b) The low temperatures of the metallization zone, in the range of 900-1000° C. at the top of the zone and 600-700° C. at the bottom, retard the kinetics of FeO reduction to metallic iron, which reduces the productivity of the shaft furnace. Moreover, in the case of production of hot briquetted iron (HBI) the low temperature of the DRI at the exit from metallization zone and further temperature losses during transition of the DRI through the cooling zone cone negatively affects the operation of briquetting equipment and HBI quality. (A DRI temperature of about 700° C. is usually required for reliable operation of briquetting equipment and production of an HBI product of good apparent density and strength).
c) Natural gas consumption is higher than optimal because the lack of $CO_2$ removal from the off-gas stream exiting the pre-reduction zone does not allow recirculation of this off-gas back to the process.
d) The reduction potential of the reducing gas entering the metallization zone, $(H_2+CO)/(H_2O+CO_2)$ ratio, is lowered because of a lack of $CO_2$ removal from the off-gas stream exiting the metallization zone.
e) No means is disclosed to control distribution of the gas flow in the metallization zone in a uniform manner.

The disadvantages associated with direct reduction of iron in shaft furnaces with natural gas self-reforming in the metallization zone in co-current flow are believed to reduce its competitiveness compared to processes using external natural gas reforming.

SUMMARY

The present subject matter generally relates to a process for effecting direct reduction of iron oxide in a shaft furnace having a pre-reduction zone near its uppermost portion, a metallization zone below the pre-reduction zone, an intermediate zone which separates the pre-reduction zone from the metallization zone and which includes a restriction to inhibit rich fuel gas from passing from the pre-reduction zone to the metallization zone, and a cooling zone below the metallization zone at the lowest portion of the shaft furnace. The process includes feeding an iron oxide burden to the shaft furnace, passing the iron oxide burden successively downwardly through the pre-reduction zone, the intermediate zone, the metallization zone, and the cooling zone of the shaft furnace while passing rich fuel gas produced by external partial combustion with a sub-stoichiometric volume of air upwardly through the pre-reduction zone in counter-current flow so as to partially reduce the iron oxide burden, and passing reducing gas downwardly through the metallization zone in co-current flow so as to substantially complete the reduction of the iron oxide burden to metallic iron. The reducing gas is first preheated in a gas heater and then subjected to partial combustion with oxygen to further increase its temperature. The process includes removing a metallized iron product (DRI) from the cooling zone.

The partial combustion of the reducing gas with oxygen can increase the temperature of the reducing gas to about 700-950° C. The reducing gas can be preheated in the gas heater to a temperature of about 500-750° C. The oxygen can be added to partially combust the reducing gas at a rate of 0-70 $Nm^3$/t of metallized iron product.

The rich fuel gas can enter the pre-reduction zone at a combustion temperature of about 1100-1350° C. before it is passed upwardly through the pre-reduction zone.

The reducing gas can be cycled through the cooling zone to cool the metallic iron to a temperature of 50-70° C. Alternatively, the reducing gas can be cycled through the cooling zone to cool the metallic iron to a temperature of about 700-750° C. if the iron product is to be fed directly to a steelmaking furnace or to be converted to hot briquetted iron (HBI).

The combustion air for production of rich fuel gas is preheated to a temperature of about 700-750° C. before it enters the burner or combustion chamber to produce rich fuel gas. The rich fuel gas is then passed upwardly through the pre-reduction zone.

Off-gas from the pre-reduction zone can be treated to remove carbon dioxide and nitrogen, mixed with evacuated rich fuel gas and natural gas and combustion air, as necessary, and then used to heat the gas heaters.

The off-gas from the pre-reduction zone can be treated to remove carbon dioxide and nitrogen, and then mixed with recycled off gas from the metallization zone and additional natural gas and water vapor to form a process reducing gas for the metallization zone and cooling gas for the cooling zone. The recycled off gas from the metallization zone can first be cleaned of $CO_2$.

The iron ore burden can be heated to a temperature of about 1000-1300° C. prior to entering the metallization zone.

The reducing gas is introduced into the intermediate zone and can include a first portion that is directed to the pre-reduction zone and a second portion that is directed to the metallization zone. The first portion of the reducing gas directed to the pre-reduction zone can include between about 5%-10% of the reducing gas introduced to the intermediate zone.

The reducing gas can include about 20-25% methane, about 40-50% hydrogen, about 20-30% carbon monoxide, water vapor, carbon dioxide and nitrogen.

Between about 45-55% of the reduction of the iron ore burden can occur in the pre-reduction zone.

The iron ore burden may be iron concentrate pellets or iron ore lumps coated with a mineral solution to inhibit agglomeration of the fresh metallized iron particles when they are heated to over about 800° C. and iron oxide particles when they are heated to about 1000-1300° C.

The rich fuel gas may be formed by burning natural gas in oxygen enriched air at about 30-50% of the stoichiometric amount required to complete combustion. The formation of the rich fuel gas occurs in an external burner or combustion chamber and the gas can then mixed with reducing gas flowing upstream from the intermediate zone.

The partial combustion of the reducing gas with oxygen can increase the temperature of the reducing gas by about 200° C.

$CO_2$ can be removed from the reducing gas exiting the furnace before the reducing gas is recycled back to the metallization zone and cooling zone to increase the hydrogen/CO ratio in the recycled reducing gas.

Water vapor (steam) can be added to the reducing gas stream supplied to the metallization zone upstream from the reducing gas pre-heater to provide a sufficient amount of $H_2O$ for methane in-situ reforming.

The flow of reducing gas and cooling gas can exit the furnace through openings connected to channels in a refractory gas evacuating device. The gas evacuating device can include a gas flow distributor having at least four hollow conduits extending in a generally radial direction at the boundary between the metallization zone and the cooling zone. The gas flow distributor can be supported by liquid cooled beams located in the cooling zone at a temperature of about 400-700° C.

The flow of reducing gas and cooling gas can exit the furnace through openings in the hollow conduits. The conduits can include liquid cooled beams extending along multiple chords of the furnace at the boundary between cooling and metallization zones. The conduits may be disposed at two or more levels within the furnace.

Distribution of the gas flow in the metallization zone can be controlled by the openings in the gas flow distributor.

The furnace can include a plurality of cross-members extending across the furnace at different elevations within the furnace to break the descending iron ore burden descending through the furnace, thereby increasing the permeability of the material column in a metallization zone.

The number of cross-members provided within the furnace can be based on the metallization zone diameter.

DRAWINGS

Figure 2:
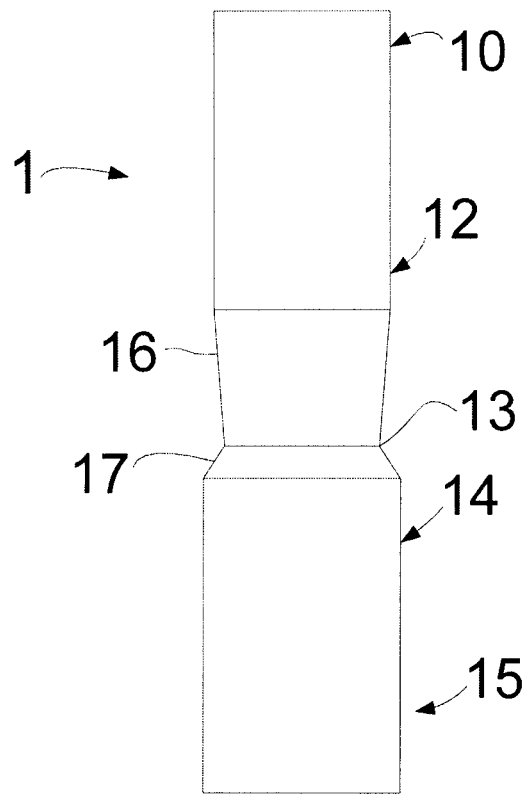
Figure 3:
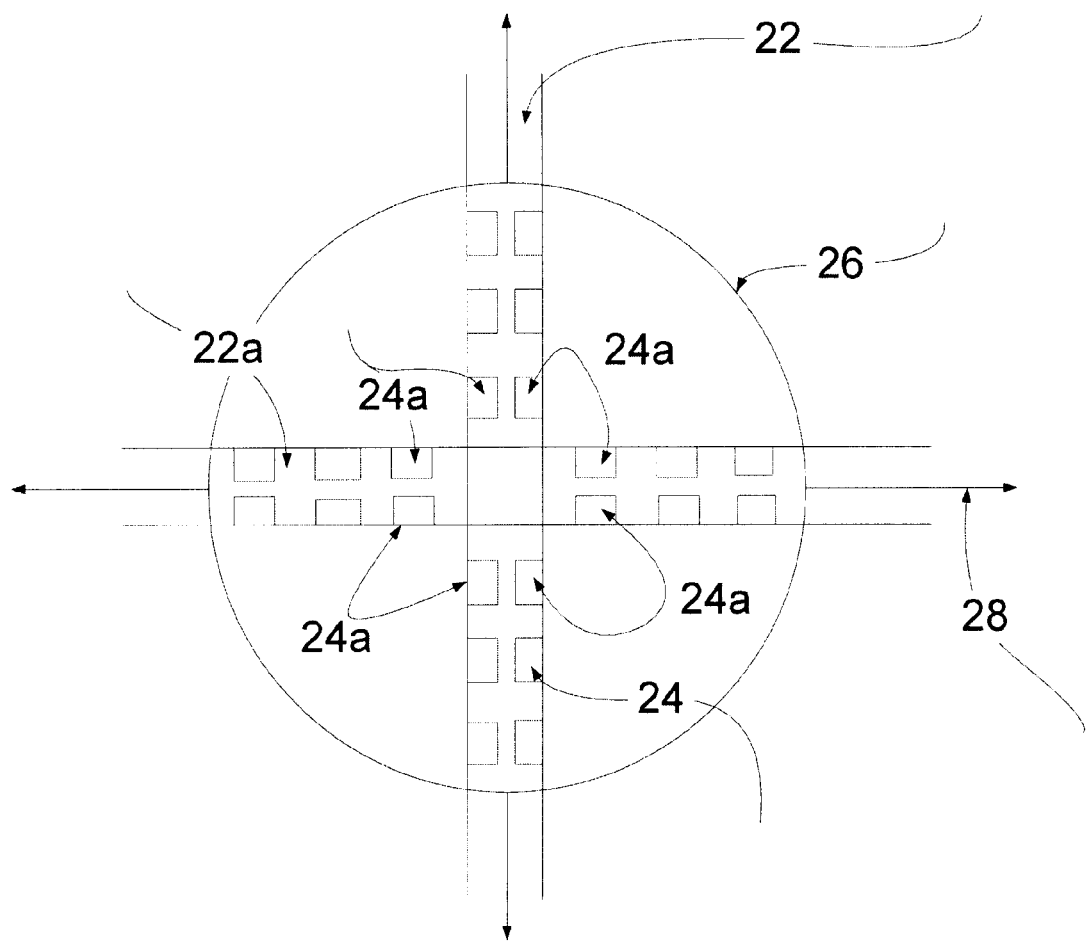

Further features of the subject matter are described with reference to the accompanying drawings, in which:

FIG. 1 is a process flow diagram of an embodiment of a process for the direct reduction of iron oxide charge material in a shaft furnace using a reducing gas;

FIG. 2 graphically illustrates the profile of the shaft of a furnace suitable for effecting the process of FIG. 1; and FIG. 3 is a schematic representation of a gas flow distributor gas evacuating device useable in the boundary between metallization and cooling zones of a shaft furnace.

DETAILED DESCRIPTION

Various apparatuses or processes will be described to provide examples of the claimed subject matter. No embodiment limits the claimed subject matter and the claims may cover processes or apparatuses that differ from those described below.

FIG. 1 shows a vertical shaft furnace 1 and ancillary equipment, suitable for implementing the process of the present subject matter. The shaft of the furnace 1 is divided into four zones. At the uppermost portion is a pre-reduction zone 10. An intermediate zone 12 below the pre-reduction zone 10 separates the pre-reduction zone 10 from a lower metallization zone 14. As seen best in FIG. 2, the intermediate zone 12 is defined by two conical frusta 16 and 17 meeting at their narrow ends at a throat 13, and diverging to connections with the zones 10 and 14. The angle of the frustum 16 to the horizontal is greater than the angle of repose of the charge. A cooling zone 15 is situated below the metallization zone 14 in the lowest portion of the shaft.

In the illustrated example, a charge, or burden, of iron oxide particles in the form of pellets or lumps of ore (or a combination thereof) coated with mineral solution is fed into the pre-reduction zone 10 from a hopper 11. The mineral solution may be any coating suitable for inhibiting sticking and agglomeration of the reduced iron in the metallization zone and pre-reduced iron oxide charge material in the pre-reduction zone, such as cement, limestone or alumina. The charge then moves into the intermediate zone 12 and passes through the throat 13 that defines a division between the intermediate zone 12 and the metallization zone 14. From the metallization zone 14, the charge moves into the cooling zone 15.

A gas evacuating device, for example gas flow distributor 20 is located at the boundary between the metallization zone 14 and the cooling zone 15. Referring also to FIG. 3, a schematic representation of the gas flow distributor 20 illustrates a device 20 that includes a plurality of hollow beams or conduits 22. Each conduit 22 comprises a plurality of gas inlet apertures 24. In the illustrated example, the conduits 22 extend in a generally radial direction.

The gas inlet apertures 24 allow gas to flow into the hollow conduits 22 for extraction from the furnace 1. In the illustrated example, each conduit 22 extends through the furnace wall 26, and can be connected to suitable piping and/or conduits to carry the gas away from the furnace 1 (illustrated by arrows 28), optionally for further processing.

In the illustrated example, the gas flow distributor 20 is a four-conduit gas flow distribution apparatus. Optionally, the conduits 22 can be liquid cooled beams. The cooling liquid can be any suitable liquid, including, for example, water and oil. Alternatively, the conduits 22 can be hollow refractory structures, or other suitable materials.

The gas flow distributor apparatus can be supported on refractory foundation structure (not shown) that is located in the cooling zone, at a temperature of about 400-700° C. Optionally, an additional plurality of refractory cross-members, optionally arranged in four cross-member sets, can extend across the diameter of the furnace 1, at various elevations within the furnace 1. Such refractory cross-members can help break the charge material passing through the furnace.

While illustrated in a four-conduit configuration, the gas flow distributor 20 can have any suitable number of conduits 22, including for example more than four conduits 22 and less than four conduits 22. The number of conduits 22 used may be selected based on the diameter of the metallization zone 14.

The flow of reducing gas and cooling gas exits the furnace through the apertures 24 in the conduits 22 that extend along multiple parallel chords (diameters in the illustrated example) of the furnace at the boundary between cooling zone 15 and metallization zone 14.

Optionally, the conduits 22 can be provided at different elevations within the furnace 1. Providing the conduits 22, and optionally other cross-members, at different elevations may help to break the iron ore burden which descends through the furnace 1. Breaking the iron ore burden material may help increase the permeability of the charge material column in the metallization zone 14.

The configuration of the apertures 24 in the conduits 22 of the gas flow distributor 20 can be used to control the uniformity of gas distribution in the metallization zone 14 and cooling zone 15. As one example, enlarging the apertures 24, or providing an increased number of apertures 24, in conduit 22a may help facilitate an increased proportion of gas flowing toward conduit 22a relative to the other conduits. Altering the gas flow in this manner may help divert gas toward the left side of the furnace 1 (as illustrated in FIG. 3). As another example, enlarging the apertures 24a in all conduits 22 will increase the central gas flow and reduce the peripheral gas flow.

In some embodiments, the conduits 22 are generally identical, and each conduit 22 includes the same number of apertures 24 which are generally of the same size and shape. Alternatively, the conduits 22 may be of different configurations and may include different numbers of apertures 24. Also, the apertures 24 need not be identical, and may be configured in a variety of different shapes and sizes that are suitable for use with the charge material passing through the furnace 1.

Referring again to FIG. 1, in the illustrated example the pre-reduction zone 10 receives rich fuel gas at a temperature of about 1100-1350° C. from a combustion chamber 2, or from an external burner which receives methane or natural gas from a connection 18 and preheated air from an air pre-heater 7. The rich fuel gas is a combination of $CO$, $H_2$, $CH_4$, and $N_2$ with relatively minor amounts of $CO_2$ and $H_2O$, for example formed by burning natural gas in preheated atmospheric air or oxygen enriched air 39 at about 30-50% of the stoichiometric amount required to complete combustion. In this example, up to about 45-55% of the reduction of the charge material can occur in the pre-reduction zone.

The rich fuel gas flows upwardly through the pre-reduction zone 10, counter-current to the descending iron oxide charge, and is discharged by means of the gas evacuating device 30 for processing by a scrubber 3 and venturi tube 4, with the flow controlled by a blower 5. The gas evacuating device 30 may be any suitable device having any suitable configuration, including, for example a combination of central and peripheral gas openings.

A portion of the off-gas from the pre-reduction zone 10 is cleaned of $CO_2$ and $N_2$ in a $CO_2/N_2$ removal unit 32 and then mixed with the evacuated rich fuel gas, along with additional natural gas and combustion air 40, as necessary. This gas mixture is used to heat an air pre-heater 7. The mixture of gases and combustion air 41 is also used to heat a process gas pre-heater 6. The process gas pre-heater 6 is used to preheat process gas delivered to the top of the metallization zone 14, after partial combustion by oxygen, to increase its temperature for passage downwardly co-currently with the furnace charge material through the metallization zone 14.

At the bottom of the metallization zone 14 the gas is discharged through the gas flow distributor 20 for processing by a corresponding scrubber 42 and venturi tube 43 with the flow controlled by the blower 44. After passing through a $CO_2$ removal unit 34 the gas is recycled to the pre-heater 6, with a portion of the $CO_2$ and $N_2$ cleaned off-gas from the pre-reduction zone and additional natural gas from line 19, as necessary. A water vapor (steam) stream can be added to the gas stream upstream from the pre-heater 6, via water vapor line 36, to provide a sufficient amount of water for methane in-situ reforming within the metallization zone 14 of furnace 1. A portion of the recycled gas is also passed to the cooling zone 15 for passage in counter-current flow to the charge before being extracted via the gas flow distributor 20.

The pre-reduction zone 10 operates in a manner generally similar to that described in U.S. Pat. No. 6,270,550, the contents of which are incorporated herein by reference, but in a different temperature range. The charge comprises pellets or lumps of ore that have been coated with a mineral solution. The coated charge can be preheated to a temperature in the range of about 1000-1300° C., rather than temperatures of only about 900 to 1000° C. as described for the charge pre-heating in U.S. Pat. No. 6,270,550.

The off-gas from the pre-reduction zone 10 of the furnace passes through the cleaning system (comprising scrubber 3 and venturi tube 4) and is used for air and gas preheating as described.

In the illustrated example, the process of metallization in the metallization zone 14 occurs in co-current flow with the reducing gas preheated up to about 700-950° C., typically about 850° C.

When compared to known processes, the partial combustion of the reducing gas, for example, with a flow of oxygen supplied downstream from the pre-heater 6 by oxygen line 38, for example in the amount of 0-70 Nm3/t of iron product, may help facilitate operating the process by providing an increase in reducing gas temperature of up to about 200° C., or using a reducing gas temperature from the pre-heater 6 that is up to about 200° C. lower. Lowering the reducing gas temperature at the preheater may help reduce metal dusting.

In the present example, the reducing gas is a mixture of 20-25% methane, 40-50% of hydrogen and 20-30% of carbon monoxide (the balance is water vapor, carbon dioxide and nitrogen). Reducing gas entering the intermediate zone 12 is divided into two flows in a ratio of about (0.05-0.1)/(0.9-0.95). The smaller flow passes upwardly through the intermediate zone 12 and enters the pre-reduction zone 10. The greater flow passes downwardly through the metallization zone 14 of the furnace. The ratio between these two flows can be determined by the volume and pressure of natural gas added to the reducing gas mixture through line 19 to maintain metallization and to replace the gas passing to the intermediate zone 12 and the pre-reduction zone 10. This division of flow, in combination with the design of the intermediate zone 12, inhibits penetration of rich fuel gas (containing oxides and nitrogen) from the pre-reduction zone 10 to the metallization zone 14. It can also provide heat exchange and metallization in the intermediate zone 12.

Hydrogen for reduction is produced in a natural gas self-reforming process on the surface of freshly reduced iron in the metallization zone 14, according to the reforming reaction of methane with $CO_2$, water vapor and methane cracking. All of these reactions are highly endothermic and require heat. The heat required for the reforming reactions and for the metallization reactions occurring in the metallization zone 14 can be at least partially provided by the heated charge material descending from the pre-reduction zone 10. As explained above, in the illustrated example the charge material in the pre-reduction zone 10 can be preheated up to about 1000-1300° C. Additional heat can be supplied to the metallization zone via the heated reducing gas entering the metallization zone 14.

Carbon monoxide for reduction is a product of water vapor reaction with carbon from natural gas or the Boudouard reaction of carbon dioxide with carbon from natural gas. The natural gas volume depends on the required extent of metallization and available volume of a portion of the off-gas from pre-reduction and preheating zone cleaned of $CO_2$ and $N_2$.

The metallized iron product and gases leave the metallization zone 14 with a temperature of about 800-1000° C. After cleaning, cooling and drying, recycled gas is split, as described above, into two flows. The first flow is mixed with additional natural gas plus available recycled gas from the pre-reduction zone that has been cleaned of $CO_2$ and $N_2$, and after preheating, enters the metallization zone. The second flow passes through the cooling zone to cool the reduced iron to a temperature of about 50-60° C. in the case of cold iron discharge or to 700-750° C. in the case of hot discharge for direct hot iron charging into an electric arc steelmaking furnace or a hot briquetting plant. Extracting $CO_2$ from the stream of reducing gas that is recycled back to the metallization zone and/or cooling zone may help increase the $H_2/CO$ ratio in the recycled reducing gas.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A process for effecting direct reduction of iron oxide in a shaft furnace having a pre-reduction zone near its uppermost portion, a metallization zone below the pre-reduction zone, an intermediate zone which separates the pre-reduction zone from the metallization zone and which includes a restriction to inhibit rich fuel gas from passing from the pre-reduction zone to the metallization zone, and a cooling zone below the metallization zone at the lowest portion of the shaft furnace, the process comprising feeding an iron oxide burden to the shaft furnace, passing the iron oxide burden successively downwardly through the pre-reduction zone, the intermediate zone, the metallization zone, and the cooling zone of the shaft furnace while passing rich fuel gas produced by external partial combustion with a sub-stoichiometric volume of air upwardly through the pre-reduction zone in counter-current flow so as to partially reduce the iron oxide burden, and passing reducing gas downwardly through the metallization zone in co-current flow so as to substantially complete the reduction of the iron oxide burden to metallic iron, the reducing gas having first been preheated in a gas heater and then subjected to partial combustion with oxygen to further increase its temperature, and removing metallic iron from the cooling zone.

2. The process of claim 1, wherein the partial combustion of the reducing gas with oxygen increases the temperature of the reducing gas to 700-950° C.

3. The process of claim 1, wherein the reducing gas is preheated in the gas heater to a temperature of 500-750° C.

4. The process of claim 1, wherein the oxygen is added to partially combust the reducing gas at a rate of 0-70 $Nm^3/t$ of iron product.

5. The process of claim 1, wherein the rich fuel gas is produced at a temperature above 1100-1350° C. before it is passed upwardly through the pre-reduction zone to preheat the iron oxide burden at the lower portion of the pre-reduction zone to about 1000-1300° C.

6. The process of claim 1, wherein the reducing gas is cycled through the cooling zone to cool the metallic iron to a temperature of about 50-70° C.

7. The process of claim 1, wherein the reducing gas is cycled through the cooling zone to cool the metallic iron to a temperature of about 700-750° C.

8. The process of claim 1, wherein combustion air used to produce the rich fuel gas is preheated to a temperature of about 700-750° C. before it is used to produce the rich fuel gas with a temperature above 1100-1350° C. which is passed upwardly through the pre-reduction zone.

9. The process of claim 1, wherein off-gas from the pre-reduction zone is treated to remove carbon dioxide and nitrogen, then mixed with evacuated rich fuel gas and natural gas and combustion air, and then used to heat the gas heater.

10. The process of claim 1, wherein off-gas from the pre-reduction zone is treated to remove carbon dioxide and nitrogen, then mixed with recycled off gas from the metallization zone that has been cleaned of $CO_2$, additional natural gas and water vapor to form a process reducing gas for the metallization zone and cooling gas for the cooling zone.

11. The process of claim 1, wherein the reducing gas is introduced into the intermediate zone, with a smaller portion being directed to the pre-reduction zone and a larger portion being directed to the metallization zone.

12. The process of claim 1, wherein the reducing gas comprises in volume about 20-25% methane, about 40-50% hydrogen, about 20-30% carbon monoxide, water vapor, carbon dioxide and nitrogen.

13. The process of claim 1, wherein between about 45-55% of the reduction of the iron ore burden occurs in the pre-reduction zone.

14. The process of claim 1, wherein the iron ore burden comprises iron oxide particles coated with a mineral solution, the mineral solution adapted to inhibit agglomeration of the iron oxide particles when the iron oxide particles are heated to over about 1000-1300° C. and metallized iron is heated to about 750-800° C.

15. The process of claim 1, wherein the rich fuel gas is formed by burning natural gas in preheated atmospheric air or oxygen enriched air at about 30-50% of the stoichiometric amount required to complete combustion.

16. The process of claim 1, wherein the formation of the rich fuel gas occurs in a burner or combustion chamber downstream from a combustion air pre heater and upstream from the pre-reduction zone.

17. The process of claim 1, wherein $CO_2$ is removed from the reducing gas exiting the furnace before the reducing gas is recycled back to the metallization zone and cooling zone to increase $H_2/CO$ ratio in the recycled reducing gas.

18. The process of claim 1, wherein water vapor is added to the reducing gas stream supplied to the metallization zone upstream from the reducing gas pre-heater to provide a sufficient amount of $H_2O$ for methane in-situ reforming.

19. The process of claim 1, wherein the flow of reducing gas and cooling gas exits the furnace through openings connected to channels in a refractory gas evacuating device comprising gas flow distributor comprising at least four hollow conduits extending in a generally radial direction at a boundary between the metallization zone and, the cooling zone, and supported by liquid cooled beams located in the cooling zone at a temperature of about 400-700° C.

20. The process of claim 1, wherein the flow of reducing gas and cooling gas exits the furnace through openings in hollow conduits, and the conduits comprise liquid cooled beams extending, along multiple chords of the furnace at a boundary between cooling and metallization zones.

21. The process of claim 1, wherein distribution of gas flow in the metallization zone is controlled by openings in the gas flow distributor.

22. The process of claim 1, wherein the furnace comprises a plurality of cross-members extending across the furnace at different elevations within the furnace to break the iron ore burden descending through the furnace thereby increasing the permeability of the material column in a metallization zone.

23. The process of claim 1, wherein a number of cross-members provided within the furnace is based on a metallization zone diameter.

* * * * *